United States Patent
Rotzoll (10) Patent No.: US 7,912,442 B2
(45) Date of Patent: *Mar. 22, 2011

(54) WAKE UP DEVICE FOR COMMUNICATIONS SYSTEM

(75) Inventor: Robert R. Rotzoll, Meridian, ID (US)

(73) Assignee: Round Rock Research, LLC, Mount Kisco, NY (US)

( * ) Notice: Subject to any disclaimer, the term of this patent is extended or adjusted under 35 U.S.C. 154(b) by 1165 days.

This patent is subject to a terminal disclaimer.

(21) Appl. No.: 11/598,241

(22) Filed: Nov. 9, 2006

(65) Prior Publication Data

US 2007/0142020 A1 Jun. 21, 2007

Related U.S. Application Data (63) Continuation of application No. 10/869,508, filed on Jun. 15, 2004, now Pat. No. 7,142,838, which is a continuation of application No. 09/899,370, filed on Jul. 2, 2001, now Pat. No. 6,760,578, which is a continuation of application No. 09/129,258, filed on Aug. 4, 1998, now abandoned, which is a continuation of application No. 08/424,827, filed on Apr. 19, 1995, now Pat. No. 5,790,946, which is a continuation of application No. 08/092,147, filed on Jul. 15, 1993, now abandoned.

(51) Int. Cl.
*H04B 1/16* (2006.01)
(52) U.S. Cl. .................... 455/343.2; 455/574
(58) Field of Classification Search .......... 455/67.11, 455/226.1, 343.1, 343.2, 151.1, 151.2, 353, 455/574; 370/311; 340/10.1, 10.33, 10.34
See application file for complete search history.

(56) References Cited

U.S. PATENT DOCUMENTS

| 4,211,995 A | 7/1980 | Smith |
| 4,219,851 A | 8/1980 | Lemak ........................... 360/40 |
| 4,304,237 A | 12/1981 | Mensink |
| 4,328,587 A | 5/1982 | Mizuno et al. ................. 375/97 |
| 4,410,789 A | 10/1983 | Story ...................... 340/825.72 |
| 4,555,788 A | 11/1985 | Merrill ......................... 375/289 |
| 4,573,043 A | 2/1986 | Heuker of Hoek et al. |
| 4,591,835 A | 5/1986 | Sharp |
| 4,611,924 A | 9/1986 | Stasin |

(Continued)

FOREIGN PATENT DOCUMENTS

EP 0467036 2/1996

(Continued)

OTHER PUBLICATIONS

Rotzoll, Robert, U.S. Appl. No. 08/092,147; "Wake Up Device for a Communications System", filed Jul. 15, 1993, now abandoned.

(Continued)

*Primary Examiner* — Quochien B Vuong
(74) *Attorney, Agent, or Firm* — Gazdzinski & Associates, PC

(57) ABSTRACT

The present invention teaches a communications system comprising a first communications device for receiving data and a wake up signal. The first communications device comprises an active mode of operation and a sleep mode of operation for reducing power consumption. Further, the system comprises means for switching the first communications device to and from sleep mode in response to receiving the wake up signal. Further, the system comprises a second communications device for transmitting data to the first device during its active mode, while transmitting the wake up signal to the first device during its sleep mode.

37 Claims, 4 Drawing Sheets

U.S. PATENT DOCUMENTS

| | | | |
|---|---|---|---|
| 4,724,545 A | 2/1988 | Hamada | 455/518 |
| 4,771,283 A | 9/1988 | Imoto | 455/352 |
| 4,866,422 A | 9/1989 | Dunnett et al. | |
| 4,885,571 A | 12/1989 | Pauley et al. | 340/573 |
| 4,910,497 A | 3/1990 | Seachris | |
| 4,929,851 A | 5/1990 | Pace | |
| 4,943,799 A | 7/1990 | Papineau | |
| 4,955,038 A | 9/1990 | Lee et al. | 375/35 |
| 4,961,073 A | 10/1990 | Drapac et al. | 455/343 |
| 4,995,099 A | 2/1991 | Davis | |
| 4,996,526 A | 2/1991 | DeLuca | |
| 5,020,037 A | 5/1991 | Raven | |
| 5,025,251 A | 6/1991 | Mittel et al. | |
| 5,034,724 A | 7/1991 | Tone | |
| 5,054,052 A | 10/1991 | Nonami | 455/343 |
| 5,055,968 A | 10/1991 | Nishi et al. | 361/395 |
| 5,077,758 A | 12/1991 | DeLuca et al. | |
| 5,145,346 A | 9/1992 | Iio et al. | 418/55.5 |
| 5,181,227 A | 1/1993 | DeLuca et al. | 455/343 |
| 5,194,860 A | 3/1993 | Jones et al. | 340/825.54 |
| 5,231,273 A | 7/1993 | Caswell et al. | |
| 5,239,306 A | 8/1993 | Siwiak et al. | |
| 5,245,346 A | 9/1993 | Nishimura et al. | 342/42 |
| 5,379,453 A | 1/1995 | Tigwell | 455/352 |
| 5,381,133 A | 1/1995 | Erhart et al. | |
| 5,448,110 A * | 9/1995 | Tuttle et al. | 340/10.1 |
| 5,507,040 A | 4/1996 | Eaton et al. | 455/343.2 |
| 5,539,775 A | 7/1996 | Tuttle et al. | |
| 5,541,976 A | 7/1996 | Ghisler et al. | 379/57 |
| 5,640,151 A | 6/1997 | Reis et al. | |
| 5,686,902 A | 11/1997 | Reis et al. | |
| 5,790,946 A | 8/1998 | Rotzoll | 455/343 |
| 6,002,344 A | 12/1999 | Bandy | |
| 6,013,949 A * | 1/2000 | Tuttle | 340/10.1 |
| 6,721,289 B1 * | 4/2004 | O'Toole et al. | 370/311 |
| 6,760,578 B2 | 7/2004 | Rotzoll | |
| 7,019,617 B2 | 3/2006 | Pratt et al. | |
| 7,142,838 B2 | 11/2006 | Rotzoll | |
| 7,405,659 B1 | 7/2008 | Hyde | |
| 2002/0001341 A1 | 1/2002 | Porcino | |
| 2007/0142020 A1 | 6/2007 | Rotzoll | |
| 2007/0285212 A1 | 12/2007 | Rotzoll | |
| 2007/0285214 A1 | 12/2007 | Rotzoll | |

FOREIGN PATENT DOCUMENTS

| | | |
|---|---|---|
| WO | WO 90/11652 | 10/1990 |

OTHER PUBLICATIONS

Rotzoll, Robert, U.S. Appl. No. 09/129,258; "Wake Up Device for a Communication System", filed Aug. 4, 1998, now abandoned.

USPTO Transaction History of U.S. Appl. No. 08/092,147, filed Jul. 15, 1993, entitled "Wake Up Device for a Communication System," now abandoned.

USPTO Transaction History of U.S. Appl. No. 08/424,827, filed Apr. 19, 1995, entitled "Wake Up Device for a Communication System," now U.S. Patent No. 5,790,946.

USPTO Transaction History of U.S. Appl. No. 09/129,258, filed Aug. 4, 1998, entitled "Wake Up Device for a Communication System," now abandoned.

USPTO Transaction History of U.S. Appl. No. 09/899,370, filed Jul. 2, 2001, entitled "Wake Up Device for a Communication System," now U.S. Patent No. 6,760,578.

USPTO Transaction History of U.S. Appl. No. 10/869,508, filed Jun. 15, 2004, entitled "Wake Up Device for a Communication System," now U.S. Patent No. 7,142,838.

USPTO Transaction History of U.S. Appl. No. 11/843,636, filed Aug. 22, 2007, entitled "Wake Up Device for a Communication System."

USPTO Transaction History of U.S. Appl. No. 11/843,637, filed Aug. 22, 2007, entitled "Wake Up Device for a Communication System."

Tuttle, Mark E., U.S. Appl. No. 07/928,899 entitled "Electrically Powered Postage Stamp or Mailing or Shipping Label Operative with Radio Frequency (RF) Communication," filed Aug. 12, 1992, now abandoned.

Tuttle, John R., U.S. Appl. No. 07/921,037 entitled "Anti-Theft Method for Detecting the Unauthorized Opening of Containers and Baggage," filed Jul. 27, 1992, now abandoned.

Tuttle, Mark E., U.S. Appl. No. 07/899,777 entitled "Radio Frequency Identification Device (RFID) and Method of Manufacture, Including an Electrical Operating System and Method," filed Jun. 17, 1992, now abandoned.

* cited by examiner

WAKE UP DEVICE FOR COMMUNICATIONS SYSTEM

CROSS REFERENCE TO RELATED APPLICATIONS

This is a continuation of U.S. patent application Ser. No. 10/869,508, filed Jun. 15, 2004, by Robert R. Rotzoll, entitled "Wake Up Device for a Communications System", now issued as U.S. Pat. No. 7,142,838, which is a continuation of U.S. patent application Ser. No. 09/899,370, filed Jul. 2, 2001, by Robert R. Rotzoll, titled, "Wake Up Device for a Communications System", now U.S. Pat. No. 6,760,578, which is a continuation of U.S. patent application Ser. No. 09/129,258, filed Aug. 4, 1998, now abandoned, which in turn is a continuation of U.S. patent application Ser. No. 08/424,827, filed Apr. 19, 1995, now U.S. Pat. No. 5,790,946, which is a continuation of U.S. patent application Ser. No. 08/092,147, filed Jul. 15, 1993, now abandoned, all of which are incorporated herein by reference.

TECHNICAL FIELD

The technical field relates to a communication system. More particularly, the invention pertains to a multi-mode communications system.

BACKGROUND

Recently, there has been increased research and development with respect to Radio Frequency Identification ("RFID") device tags. These RFID tags essentially comprise small radio transceivers attached to a movable object. By coupling an RFID tag to an object, it has been the intent of developers of creating a system for tracking the whereabouts and identification of the object.

Several RFID systems have been developed. Generally, these designs have been relatively large in size—approximately cigarette package—and have been generally fabricated using hybrid circuit techniques. Besides their bulky size, the systems require the RFID tag to constantly remain activated.

Recently, there have been several breakthroughs in techniques in the design and manufacture of RFID tags. Examples of these include "Radio Frequency Identification Device (RFID) and Method of Manufacture, Including an Electrical Operating System and Method," U.S. patent application Ser. No. 07/899,777, filed on Jun. 17, 1992, now abandoned; "Anti-Theft Method for Detecting The Unauthorized Opening of Containers and Baggage," U.S. patent application Ser. No. 07/921,037, Jul. 24, 1992, now abandoned; "Electrically Powered Postage Stamp or Mailing or Shipping Label Operative with Radio Frequency (RF) Communications," U.S. patent application Ser. No. 07/928,899, filed on Aug. 12, 1992; now abandoned; and "Modulated Spread Spectrum in RF Identification Systems Method," U.S. patent application Ser. No. 08/032,384, filed on Mar. 17, 1993, now U.S. Pat. No. 5,539,775, all commonly assigned to Micron Semiconductor, Incorporated, and all incorporated herein by reference.

It has been thus a design criteria that these RFID tags be light weight and inexpensive. However, these systems previously have not addressed the need of low power consumption. Presently, RFID tags must be active to detect their location, as well as additional information. As such, there is a need to develop a RFID tag communications system having an active mode for receiving/transmitting data and a sleep mode for reducing power consumption.

SUMMARY OF INVENTION

In a first aspect of the invention, a method of tracking inventory is disclosed. In one embodiment, the method comprises: positioning an interrogator unit in a first region, the interrogator unit comprising one or more transceivers communicatively coupled to one or more antennas, the interrogator unit being configured to transmit radio frequency (RF) signals; transmitting by the interrogator unit via at least one of the one or more transceivers a first RF signal; receiving by a first RFID tag the first RF signal; transitioning to a first mode by the first RFD tag when the first RFID tag determines the first RF signal is at a first frequency and a first data rate; and transitioning to a second mode by the first RFID tag when the first RFID tag determines the first RF signal is at a second frequency and a second data rate. In one variant, the first RFID tag remains in the first mode until transitioning into the second mode upon receipt of the first RF signal at the second frequency and the second data rate, and the first RFID tag remaining in the second mode until transitioning into the first mode upon receipt of the first RF signal at the first frequency and the first data rate.

In a second aspect of the invention, a system to track inventory is disclosed. In one embodiment, the system comprises: an interrogator unit positioned in a region, the interrogator unit comprising one or more transceivers communicatively coupled to one or more antennas, the interrogator unit being configured to transmit a radio frequency (RF) wake up signal via at least one of the one or more transceivers over the one or more antennas; and at least one RFID tag to receive the RF wake up signal, the at least one RFID tag configured to transition out of a sleep mode when the at least one RFID tag detects the RF wake up signal according to a predetermined frequency and a predetermined data rate, wherein the at least one RFID tag is configured to remain in the sleep mode until receipt of the RF wake up signal according to the predetermined frequency and the predetermined data rate.

In a third aspect of the invention, an interrogator is disclosed. In one embodiment, the interrogator comprises: at least one antenna; and at least one transceiver communicatively coupled to the at least one antenna, the at least one transceiver to transmit a first radio frequency (RF) signal to at least one RFID tag via the at least one antenna, the at least one transceiver to transmit the first RF signal according to a first frequency and a first data rate to bring the at least one RFID tag out of a sleep mode, the at least one transceiver to transmit a second radio frequency (RF) signal via the at least one antenna to the RFID tag to cause the RFID tag to call up an ID number stored in a memory and to transmit the ID number. In one variant, the at least one RFID tag is configured to remain in the sleep mode until receipt of the first RF signal in accordance with the first frequency and the first data rate.

In a fourth aspect of the invention, a method of transitioning between modes is disclosed. In one embodiment, the method comprises: positioning an interrogator unit in a first region, the interrogator unit comprising one or more transceivers communicatively coupled to one or more antennas, the interrogator unit being configured to transmit radio frequency (RF) signals; transmitting by the interrogator unit via at least one of the one or more transceivers a first RF signal; receiving by a first radio frequency device the first RF signal; transitioning to a first mode by the first radio frequency device when the first radio frequency device determines the first RF signal is at a first frequency and a first data rate; and transitioning to a second mode by the first radio frequency device when the first radio frequency device determines the first RF signal is at a second frequency and a second data rate. In one variant, the first radio frequency device remains in the first mode until transitioning into the second mode upon receipt of the first RF signal at the second frequency and the second data rate, and the first radio frequency device remaining in the second mode until transitioning into the first mode upon receipt of the first RF signal at the first frequency and the first data rate.

In a fifth aspect of the invention, a system for waking up a radio frequency device is disclosed. In one embodiment, the system comprises: an interrogator unit positioned in a region, the interrogator unit comprising one or more transceivers communicatively coupled to one or more antennas, the interrogator unit being configured to transmit a radio frequency (RF) wake up signal via at least one of the one or more transceivers over the one or more antennas; and at least one radio frequency device to receive the RF wake up signal, the at least one radio frequency device configured to transition out of a sleep mode when the at least one radio frequency device detects the RF wake up signal according to a predetermined frequency and a predetermined data rate, wherein the at least one radio frequency device is configured to remain in the sleep mode until receipt of the RF wake up signal according to the predetermined frequency and the predetermined data rate.

DETAILED DESCRIPTION OF THE ILLUSTRATED EMBODIMENTS

Figure 1:
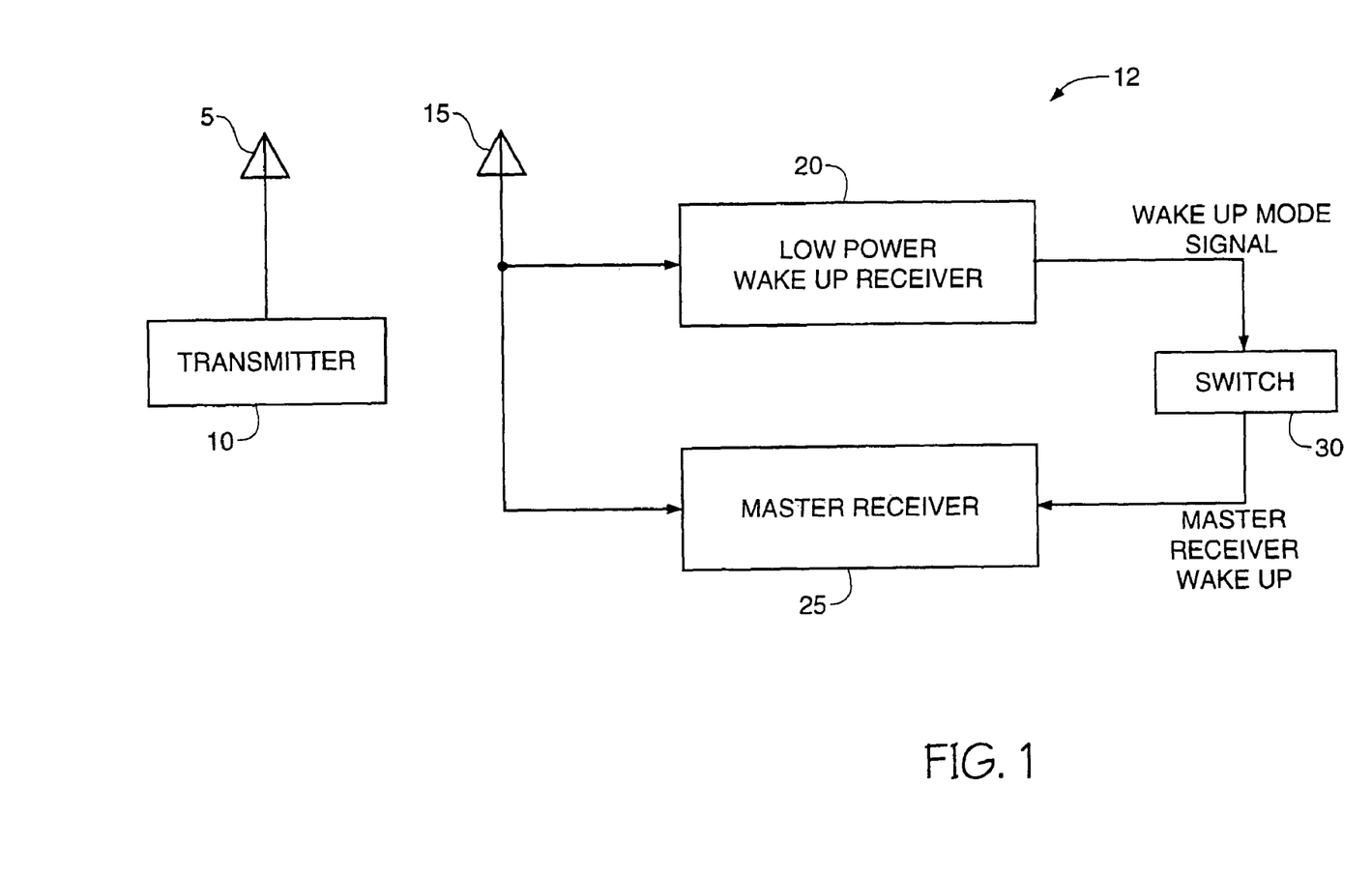
FIG. 1 is a high level architecture of the present invention.

Referring to FIG. 1, a wake up device for a communications system is illustrated. As shown, the system comprises a first and second communications devices; a transmitter 10 and a receiver 12. Transmitter 10 is coupled to antenna 5 in order to properly transmit data and a wake up signal to receiver 12. Receiver 12 comprises a wake up receiver 20 and a master receiver 25, which are both coupled to antenna 15. Further, receiver 12 comprises a switch, which enables the substantial energy savings. It should be noted that the issue of energy saving with respect to transmitter 10 is not important as it is not coupled to an RFID tag, unlike is receiver 12 in the preferred embodiment.

To accomplish these energy savings, master receiver 25 comprises at least two modes of operation. In the preferred embodiment, the first mode is referred to as an active mode of operation and the second mode referred to as a sleep mode. Further, wake up receiver 20 requires substantially less power for its operation than master receiver 25.

In the active mode of operations, master receiver 25 functions as a traditional receiver, capable of receiving data transmitted by transmitter 10. By contrast, in order to reduce power consumption during periods of inactivity, master receiver 25 comprises a sleep mode. During sleep mode, master receiver 25 utilizes a minimal amount of energy for biasing purposes. Thus, by utilizing this design scheme, a substantial power savings from receiver 12 can be achieved, which directly corresponds to the life expectancy of battery powered receiver 12. For example, in one receiver design, a 98% power savings has been observed.

Coupled between master receiver 25 and wake up receiver 20, is switch 30. Switch 30 switches master receiver 25 between its mode of operation—i.e., active to sleep mode, as well as sleep mode to active mode—in response to the arrival of a wake up signal. As such, transmitter 10 transmits a wake up signal to receiver 12, which is ultimately received by wake up receiver 20. Upon detecting the wake up signal, a mode change signal is generated to switch 30. Accordingly, switch 30 changes the mode of operation of master receiver.

In the preferred embodiment of the present invention, switch 30 only switches master receiver 25 from sleep mode to active mode. Here, upon receiving wake up signal, wake up receiver 20 generates a mode change signal to switch 30. In response, switch 30 senses the mode of operation of master receiver 25. Thus, switch 30 switches master receiver to active mode upon sensing master receiver 25 as being in sleep mode. Contrarily, switch 30 is inactive upon sensing master receiver 25 as being in an active mode of operation. In this embodiment, master receiver 25 further comprises a timing scheme which switches master receiver from active mode to sleep mode. This timing scheme is enabled when a predetermined period passes in master receiver 25 without receiving any data from transmitter 10. The length of the period is dependent on several design criteria including the system's application and environment, as well as the desired probabilities of error. In a further embodiment of the present invention, switch 30, low power receiver 20 and master receiver 25 are all positioned on a radio frequency identification ("RFID") tag.

Figure 2:
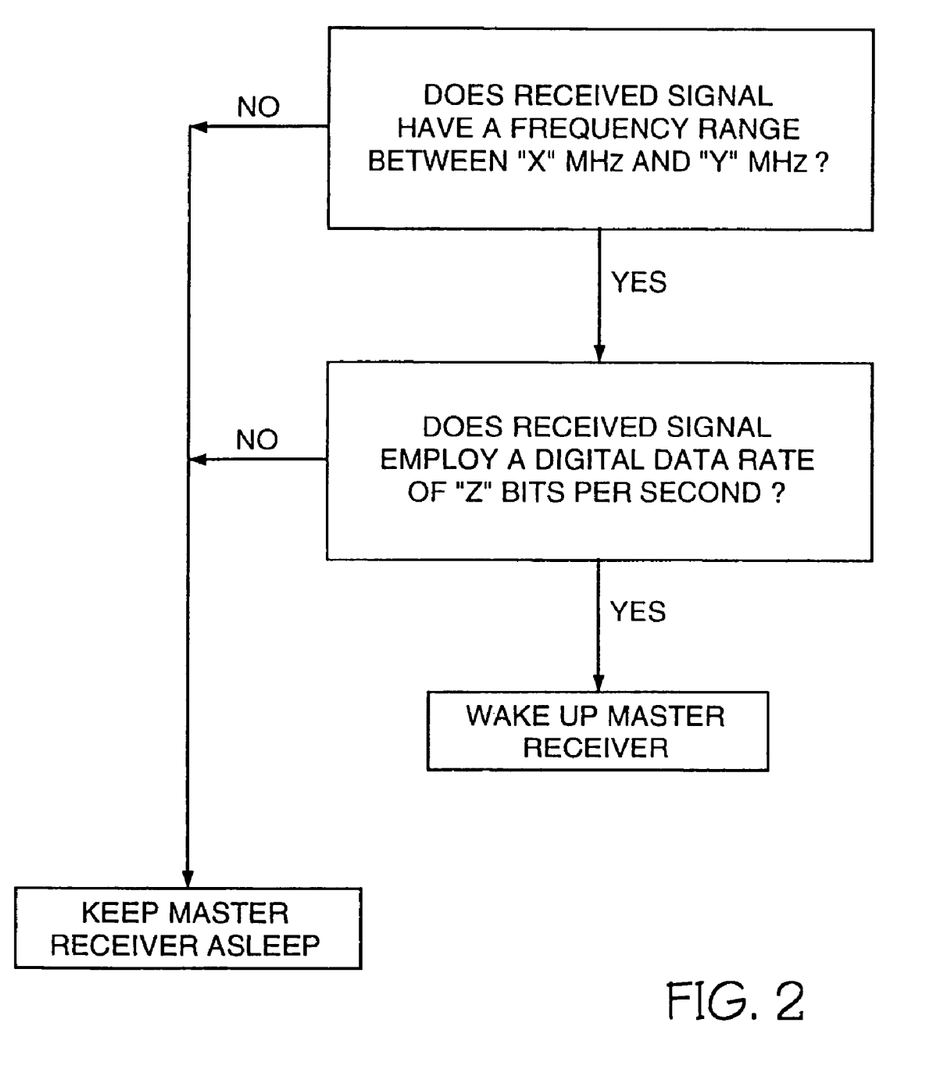
FIG. 2 is a flow chart illustrating the method of the present invention.

Referring to FIG. 2, a flow chart illustrating the method for reducing the consumption of energy in operating a communications system of the present invention employing the architecture described herein. Initially, a wake up signal is transmitted by transmitter 10, and subsequently, the wake up signal is detected by wake up receiver 20. Finally, the mode of operation of the master receiver 25 is changed in response to the detection of the wake up signal.

In one embodiment of the present invention, the step of detecting the wake up signal, itself, comprises a series of steps. First, a predetermined frequency is detected from the wake up signal. In the event that frequency is found, a predetermined data rate is detected from the wake up signal. If that frequency is not found, master receiver 25 is kept asleep. In the event that data rate of transmission of a certain number of bits per second is found, an output signal is generated. If that data rate of transmission is not found, master receiver 25 is kept asleep. This step of generating an output signal further comprises the step of comparing the output signal with a reference voltage. By doing so, switch 30 is enabled upon detecting a predetermined frequency and a predetermined data rate of transmission and master receiver 25 is woken.

Figure 3:
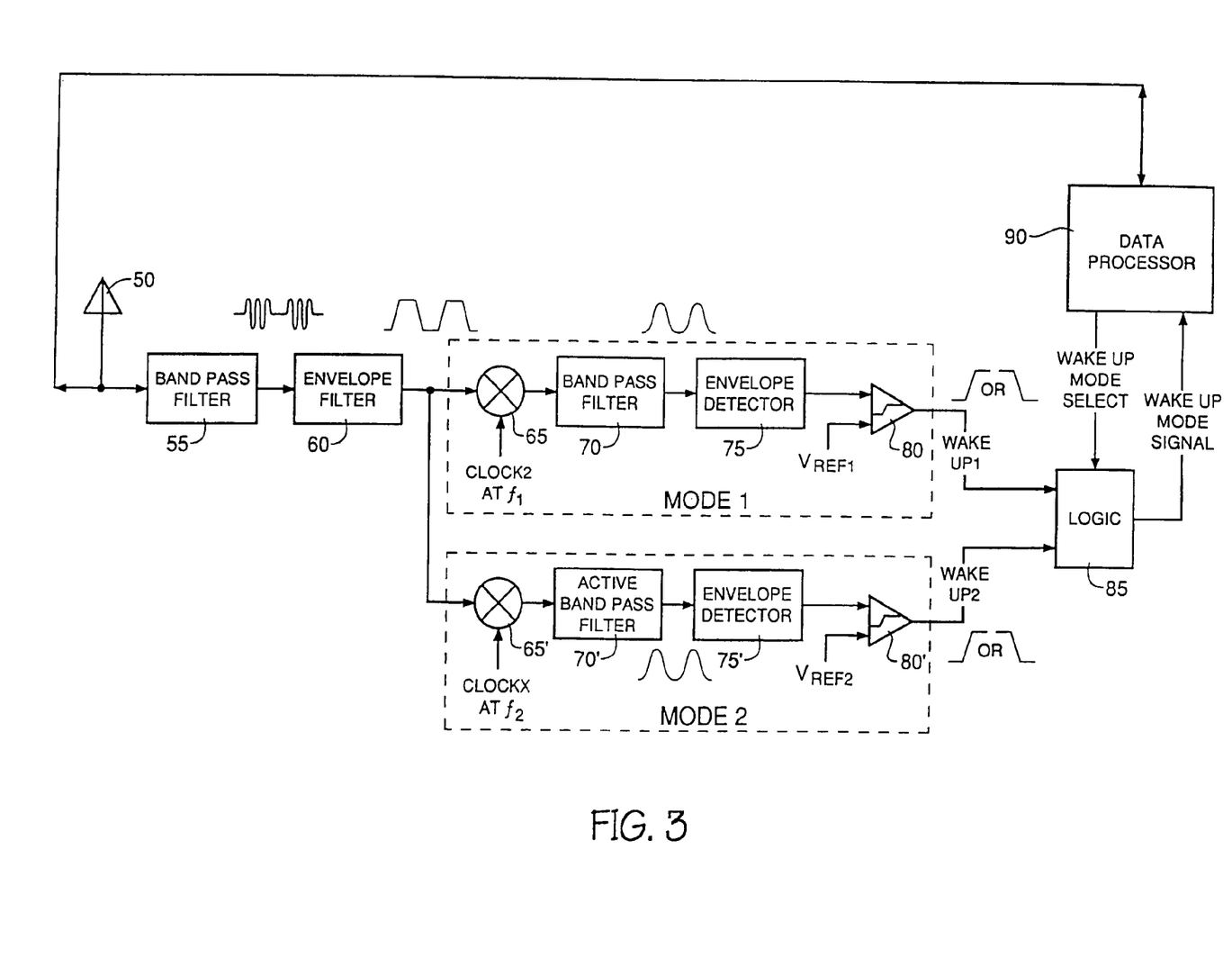
FIG. 3 illustrates a first embodiment of the present invention.

Referring to FIG. 3, a first embodiment of the present invention is depicted. In order to receive a wake up signal, an antenna 50 is coupled with a frequency detector, realized by a first bandpass filter 55 having a bandwidth and a radio frequency ("RF") output. First bandpass filter 55, operating in tandem with antenna 59, detects the frequency of the wake up signal. To avert the detection of noise as a wake up signal, the bandwidth of first bandpass filter 55 is substantially narrow. Nonetheless, in the preferred embodiment, first bandpass filter 55 must detect a predetermined frequency and a related harmonic.

While the present invention utilizes a narrow bandpass scheme for frequency detection, it should be obvious to one of ordinary skill in the art that the frequency detector can be realized using alternate hardware. For example, in place of a narrow bandpass filter, a generalized filter having an output coupled directly with a comparator would achieve the identical functional purpose were the comparator also fed a frequency reference or source. Another example would be a resonator circuit.

Coupled to bandpass filter 55 is an envelope detector 60. Upon receiving the RF bandpass output from filter 55, envelope detector 60 demodulates the RF bandpass output into a first Base Band ("BB") signal. Envelope detector 60 achieves this objective in two steps. However, it should be obvious to one of ordinary skill in the art that the functional objective of envelope detector 60 can be realized by alternate means. Initially, envelope detector 60 rectifies the RF bandpass output by means of a rectifier. Subsequently, a low pass filter is employed for filtering the rectified RF bandpass output and forming the first BB signal.

Once the frequency of the wake up signal has been detected, the present invention employs a data rate detector for detecting the rate of data transmission of the incoming signal, which thereby rejects out of data rate signals. As such, this design employs two means for assessing two characteristics of the incoming signal. Thus, by this approach, noise and/or other sources will not falsely trigger the master receiver into waking up.

The data rate detector can be realized by a second bandpass filter 70 having a second bandwidth and a second BB signal as its output. To avert the detection of noise as a wake up signal, the second bandwidth of bandpass filter 55 is substantially narrow bandwidth. In one embodiment of the present invention, the second bandwidth is substantially narrower than the first bandwidth of the first bandpass filter. However, in the preferred embodiment, the second bandwidth need only detect a singular frequency without any harmonics.

While the present invention utilizes the herein described means for data rate detection, it should be obvious to one of ordinary skill in the art that the data rate detector can be realized using alternate hardware. For example, a comparator scheme or resonator circuit could be employed. Further, digital circuitry could also be used to accomplish the same purpose as the data detector described herein.

Further, coupled with second bandpass filter 70 is a second envelope detector 75. In order to detect the data rate of incoming signal and ascertain whether it is the wake up signal, second envelope detector 75 generates an output signal corresponding to BB signal input received from second bandpass filter 70 by demodulating the BB signal input. Second envelope detector 75 achieves this objective in two steps. However, it should be obvious to one of ordinary skill in the art that the functional objective of second envelope detector 75 can be realized by alternate means. Initially, envelope detector 75 rectifies the BB input signal second bandpass filter 70 by means of a rectifier. Subsequently, a low pass filter is employed for filtering the rectified BB signal input. As a result of this architecture, second envelope detector 75 generates an upward ramped step or a downward ramped step output signal.

Coupled to second envelope detector 75 is a comparator 80. Comparator 80 is employed to compare the output signal of second envelope detector 75 with a voltage reference. By this arrangement, comparator 80 triggers an internal wake up$_1$ signal. Wake up$_1$ signal is subsequently fed into control logic 85, which is coupled with a data processor 90, for waking up the master receiver 25.

In an alternate embodiment of the present invention, a second data rate detector is utilized. Second data rate detector, being coupled to the frequency detector, receives the first BB signal generated by the first envelope detector 60. The second data rate detector can be designed in an identical fashion as the first data detector described herein.

By this arrangement, comparator 80' triggers an internal wake up$_2$ signal which is input into control logic 85, which is coupled with a data processor 90, for waking up the master receiver 25. By employing two data rate detectors, the wake up receiver can switch the data rate to be detected from the wake up signal. Here, switching logic 85 in combination with data processor 90 recognize the data rate to be detected from the wake up signal. Subsequently, when a change is necessary, a second data rate is selected as being the data rate to be detected from the wake up signal for the purposes of waking master receiver 25.

Moreover, this two data rate detector scheme can also be employed for the purpose of enabling the wake up receiver to switch modes of operation—i.e., sleep mode and active mode—as described hereinabove. Thus, when a first data rate is received, master receiver 25 is to be woken in to active mode, while master receiver 25 is to be put into sleep mode when a second data rate is received.

In a further alternate embodiment of the present invention, a mixer 65 is employed. Mixer 65 is coupled between first envelope detector 60 and second bandpass filter 70. Mixer 65 is used to provide a means for frequency translating the RF bandpass output. The extent of the translation performed by mixer 65 corresponds to the local oscillator. The local oscillator, having a clock rate of $f_1$ provides a reference oscillating signal to the mixer 65.

Figure 4:
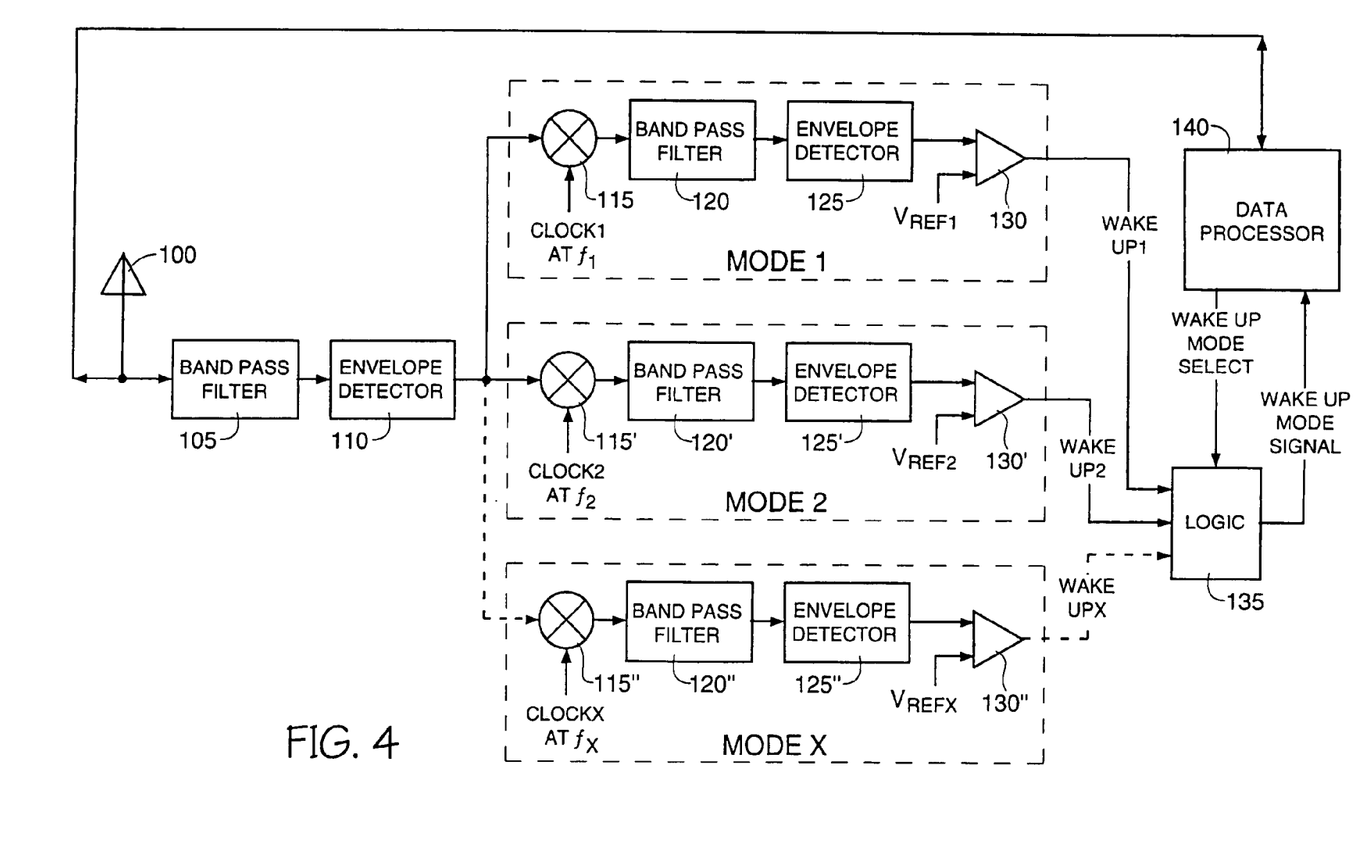
FIG. 4 illustrates a second embodiment of the present invention.

Referring to FIG. 4, an alternate embodiment of the present invention is illustrated. The architecture disclosed here is further development of an alternate embodiment of FIG. 3. Here, three data rate detectors are employed. Third data rate detector, being coupled to the frequency detector, receives the first BB signal generated by a first envelope detector 110. The third data rate detector can be designed in an identical fashion as the first and second data detectors described herein.

By this arrangement, comparator 130''' triggers an internal wake up$_x$ signal which is input into control logic 135, which is coupled with a data processor 140, for waking up the master receiver 25. By employing three data rate detectors, the wake up receiver can switch the data rate to be detected from the wake up signal. Here, switching logic 135 in combination with data processor 140 recognize the data rate to be detected from the wake up signal. Subsequently, when a change is necessary, a third data rate is selected as being the data rate to be detected from the wake up signal for the purposes of waking master receiver 25.

In still another embodiment of the present invention, a modulation detector (not shown) is further incorporated for detecting a modulation scheme. In this embodiment, the wake up signal must also comprise a modulation format or formats. As such, the modulation detector can detect a modulation scheme selected from the group including at least amplitude modulation, frequency modulation, amplitude shift key modulation, phase shift key modulation, frequency shift key modulation, and multiphase frequency shift key modulation. The modulation detector can be realized by a variety of designs known to one of ordinary skill in the art. Thus, upon receiving the wake up signal, the modulation detector detects the format of the wake up signal and responds accordingly.

All of the U.S. Patents cited herein are hereby incorporated by reference as if set forth in their entirety.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

I claim:

1. A method of tracking inventory, the method comprising:
positioning an interrogator unit in a first region, the interrogator unit comprising one or more transceivers communicatively coupled to one or more antennas, the interrogator unit being configured to transmit radio frequency (RF) signals;
transmitting by the interrogator unit via at least one of the one or more transceivers a first RF signal;
receiving by a first RFID tag the first RF signal;
transitioning to a first mode by the first RFID tag when the first RFID tag determines the first RF signal is at a first frequency and a first data rate; and
transitioning to a second mode by the first RFID tag when the first RFID tag determines the first RF signal is at a second frequency and a second data rate, the first RFID tag remaining in the first mode until transitioning into the second mode upon receipt of the first RF signal at the second frequency and the second data rate, and the first RFID tag remaining in the second mode until transitioning into the first mode upon receipt of the first RF signal at the first frequency and the first data rate.

2. The method of claim 1, wherein the first frequency is substantially equivalent to the second frequency.

3. The method of claim 1, wherein the first RFID tag determines a frequency and a data rate of the first RF signal via one or more bandpass filters and one or more envelope detectors.

4. The method of claim 1, wherein the first RFID tag consumes less power in the first mode than the second mode.

5. The method of claim 1, wherein the first mode comprises operating states in which the first RFID tag requires more power than operating states of the second mode.

6. A system to track inventory, the system comprising:
an interrogator unit positioned in a region, the interrogator unit comprising one or more transceivers communicatively coupled to one or more antennas, the interrogator unit being configured to transmit a radio frequency (RF) wake up signal via at least one of the one or more transceivers over the one or more antennas; and
at least one RFID tag to receive the RF wake up signal, the at least one RFID tag configured to transition out of a sleep mode when the at least one RFID tag detects the RF wake up signal according to a predetermined frequency and a predetermined data rate, wherein the at least one RFID tag is configured to remain in the sleep mode until receipt of the RF wake up signal according to the predetermined frequency and the predetermined data rate.

7. The system of claim 6, wherein the RF wake up signal includes a singular frequency signal carried via a radio frequency signal.

8. The system of claim 7, wherein the RF wake up signal is in a frequency range from 200 MHz to 10 GHz.

9. The system of claim 7, wherein the RFID tag comprises at least one bandpass filter to detect the singular frequency signal.

10. The system of claim 9, wherein the bandpass filter is configured to detect a singular frequency without harmonics.

11. The system of claim 6, wherein the RFID tag is configured to detect a predetermined frequency in the RF wake up signal to determine the presence of the RF wake up signal.

12. The system of claim 6, wherein the RFID tag consumes less power in the sleep mode than being out of the sleep mode.

13. The system of claim 6, wherein the interrogator unit is configured to transmit data via radio frequency signals to the RFID tag; and the RFID tag is configured to store the data.

14. The system of claim 6, wherein the interrogator unit and the RFID tag are configured to communicate an ID number via radio frequency signals.

15. The system of claim 14, wherein the ID number is modulated on a carrier via shift keying.

16. The system of claim 14, wherein the RFID tag is configured to call up the ID number from a memory and transmit the ID number to the interrogator unit via radio frequency signals.

17. An interrogator, comprising:
at least one antenna; and
at least one transceiver communicatively coupled to the at least one antenna, the at least one transceiver to transmit a first radio frequency (RF) signal to at least one RFID tag via the at least one antenna, the at least one transceiver to transmit the first RF signal according to a first frequency and a first data rate to bring the at least one RFID tag out of a sleep mode, the at least one transceiver to transmit a second radio frequency (RF) signal via the at least one antenna to the RFID tag to cause the RFID tag to call up an ID number stored in a memory and to transmit the ID number;
wherein the at least one RFID tag is configured to remain in the sleep mode until receipt of the first RF signal in accordance with the first frequency and the first data rate.

18. The interrogator of claim 17, wherein the first RF signal includes a singular frequency signal provided on a radio frequency carrier.

19. The interrogator of claim 18, wherein the second RF signal includes data modulated on the radio frequency carrier via a shift keying technique.

20. The interrogator of claim 19, wherein the shift keying technique is based on binary phase shift keying.

21. The interrogator of claim 17, wherein the interrogator unit is configured to transmit data via radio frequency signals to the RFID tag after transmitting the first RF signal; and the RFID tag is configured to store the data in the memory.

22. A method of transitioning between modes, the method comprising:
positioning an interrogator unit in a first region, the interrogator unit comprising one or more transceivers communicatively coupled to one or more antennas, the interrogator unit being configured to transmit radio frequency (RF) signals;
transmitting by the interrogator unit via at least one of the one or more transceivers a first RF signal;
receiving by a first radio frequency device the first RF signal;
transitioning to a first mode by the first radio frequency device when the first radio frequency device determines the first RF signal is at a first frequency and a first data rate; and
transitioning to a second mode by the first radio frequency device when the first radio frequency device determines the first RF signal is at a second frequency and a second data rate, the first radio frequency device remaining in the first mode until transitioning into the second mode upon receipt of the first RF signal at the second frequency and the second data rate, and the first radio frequency device remaining in the second mode until transitioning into the first mode upon receipt of the first RF signal at the first frequency and the first data rate.

23. The method of claim 22, wherein the first frequency is substantially equivalent to the second frequency.

24. The method of claim 22, wherein the first radio frequency device determines a frequency and a data rate of the first RF signal via one or more bandpass filters and one or more envelope detectors.

25. The method of claim 22, wherein the first radio frequency device consumes less power in the first mode than the second mode.

26. The method of claim 22, wherein the first mode comprises operating states in which the first radio frequency device requires more power than operating states of the second mode.

27. A system for waking up a radio frequency device, the system comprising:
  an interrogator unit positioned in a region, the interrogator unit comprising one or more transceivers communicatively coupled to one or more antennas, the interrogator unit being configured to transmit a radio frequency (RF) wake up signal via at least one of the one or more transceivers over the one or more antennas; and
  at least one radio frequency device to receive the RF wake up signal, the at least one radio frequency device configured to transition out of a sleep mode when the at least one radio frequency device detects the RF wake up signal according to a predetermined frequency and a predetermined data rate, wherein the at least one radio frequency device is configured to remain in the sleep mode until receipt of the RF wake up signal according to the predetermined frequency and the predetermined data rate.

28. The system of claim 27, wherein the RF wake up signal includes a singular frequency signal carried via a radio frequency signal.

29. The system of claim 28, wherein the RF wake up signal is in a frequency range from 200 MHz to 10 GHz.

30. The system of claim 28, wherein the radio frequency device comprises at least one bandpass filter to detect the singular frequency signal.

31. The system of claim 30, wherein the bandpass filter is configured to detect a singular frequency without harmonics.

32. The system of claim 27, wherein the radio frequency device is configured to detect a predetermined frequency in the RF wake up signal to determine the presence of the RF wake up signal.

33. The system of claim 27, wherein the radio frequency device consumes less power in the sleep mode than being out of the sleep mode.

34. The system of claim 27, wherein:
  the interrogator unit is configured to transmit data via radio frequency signals to the radio frequency device; and
  the radio frequency device is configured to store the data.

35. The system of claim 27, wherein the interrogator unit and the radio frequency device are configured to communicate an ID number via radio frequency signals.

36. The system of claim 35, wherein the ID number is modulated on a carrier via shift keying.

37. The system of claim 35, wherein the radio frequency device is configured to call up the ID number from a memory and transmit the ID number to the interrogator unit via radio frequency signals.

* * * * *